(12) United States Patent
Saavedra et al.

(10) Patent No.: US 7,484,684 B2
(45) Date of Patent: Feb. 3, 2009

(54) ROLLING WIRE UNWRAP DEVICE

(76) Inventors: Daniel R. Saavedra, P.O. Box 423, Grapeland, TX (US) 75844-0423; Nancy Fritts-Saavedra, P.O. Box 423, Grapeland, TX (US) 75844-0423

( * ) Notice: Subject to any disclaimer, the term of this patent is extended or adjusted under 35 U.S.C. 154(b) by 396 days.

(21) Appl. No.: 11/168,074

(22) Filed: Jun. 27, 2005

(65) Prior Publication Data

US 2006/0289693 A1    Dec. 28, 2006

(51) Int. Cl.
*B65H 75/40* (2006.01)
(52) U.S. Cl. .............. 242/391; 242/557; 242/596.3
(58) Field of Classification Search ............ 242/391, 242/533.8, 557, 403, 403.1, 596.3
See application file for complete search history.

(56) References Cited

U.S. PATENT DOCUMENTS

| | | | | |
|---|---|---|---|---|
| 1,230,794 A | * | 6/1917 | Schick | 242/557 |
| 2,488,425 A | * | 11/1949 | Morrone | 242/403.1 |
| 2,917,253 A | * | 12/1959 | Way | 242/596.3 |
| 3,009,667 A | * | 11/1961 | Browne | 242/403.1 |
| 3,831,877 A | * | 8/1974 | Bennett et al. | 242/403.1 |
| 4,095,706 A | * | 6/1978 | Schwien et al. | 242/557 |
| 5,509,770 A | * | 4/1996 | Burenga | 242/557 |
| 7,044,414 B1 | * | 5/2006 | McQuerry | 242/403.1 |

* cited by examiner

*Primary Examiner*—William A Rivera
(74) *Attorney, Agent, or Firm*—Patwrite LLC; Mark David Torche

(57) ABSTRACT

A handcart for unrolling wire is disclosed. In a preferred embodiment, one leg of the handcart is hinged to permit a roll of wire to be loaded or unloaded onto a horizontal spindle on the cart without lifting the roll. The axles of the wheels of the cart are offset from the spindle such that tipping the cart lifts the roll of wire from the surface on which it is resting and permits the wire to payout from the roll as the cart is rolled across the ground.

2 Claims, 3 Drawing Sheets

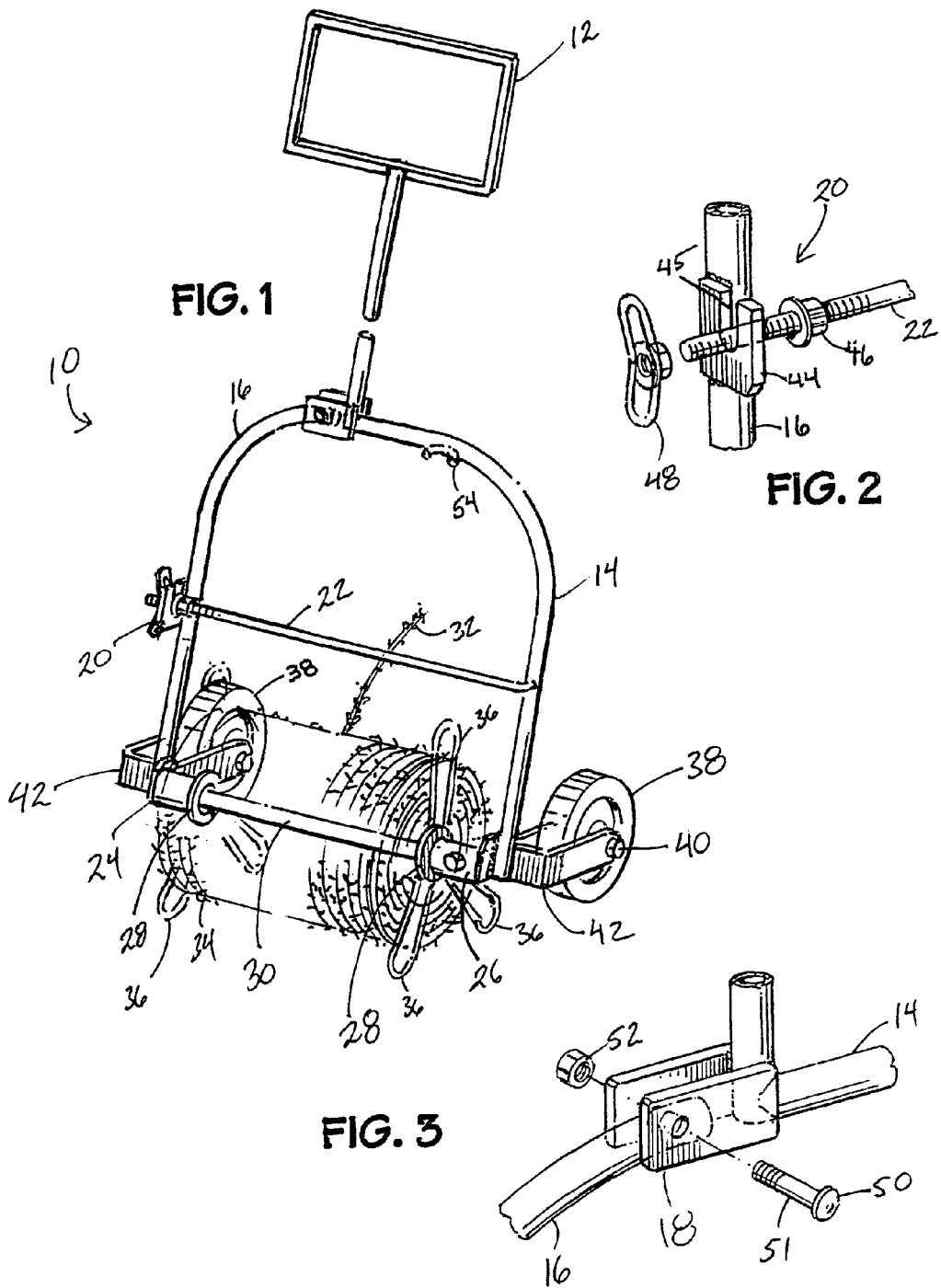

ROLLING WIRE UNWRAP DEVICE

CROSS-REFERENCE TO RELATED APPLICATIONS none

BACKGROUND OF THE INVENTION

1. Field of the Invention

This invention relates to tools for the installation of wire. More particularly, it relates to devices for unrolling wire (e.g., barbed wire) in the field.

2. Description of the Related Art

Wire, be it electrical wire or fence wire, is commonly supplied in the form of rolls which may be wound on a reel or drum. If the wire is of sufficient stiffness, it may hold the roll shape without being wound on a reel or drum. To avoid twisting the wire, it should be unwound from the reel or drum (as opposed to being spiraled off one end of the roll).

Most reels and drums have a central, axial opening through which a rod or shaft may be placed to allow the reel or drum to rotate freely. Perhaps the most simple wire dispenser is a dowel inserted through the center of the roll. Holding the dowel on either side of the roll while walking backwards allows the wire to pay out as the roll unwinds. Heavier rolls of wire may be unwound by two people, one on either side of the roll supporting the respective ends of a shaft inserted through the roll, reel or drum. Still heavier rolls may be carried on motorized vehicles—a common method being a shaft resting on the side walls of a pickup truck's bed.

Barbed wire is commonly manufactured in rolls 80 rods (1320 feet) in length, 70-90 lbs per roll depending on the gauge, number of strands, type and number of barbs. The rolls are typically wound on a wire frame having radial arms at either end for containing the roll (as shown in phantom in the drawing figures). Since it is both heavy and sharp, it is highly desirable to utilize a dispensing device of some sort when stringing barb wire.

One method of the prior art for the paying out of fencing wire and barbed wire is the wire spinner. An old plough disk can be used as a type of spinner by welding a piece of 25 mm water pipe into the centre of the disk with the disks edge resting on the ground. The reel of wire may be slipped onto the pipe and paying out the wire becomes a one person operation. However, if the spinner is stationary, the wire must be dragged across the ground. To move the spinner, a conveyance of some sort is required. An alternative to this is to slip the handle of a shovel through the eye of the reel and have two fencers then walk the barbed wire along the fence line having tied off one end.

Wire unrollers are available for mounting on the back of an All Terrain Vehicle (ATV). Such devices are said to permit one to quickly or slowly release a spool of wire when building fences. An adjustable drag brake prevents free wheeling. Hydraulically-powered wire winders are available for Cat. I, Cat. II or Cat. III tractor hitches. It is said that wire may be unwound from the device by putting the hydraulic control lever in the "float" position while the tractor is driven across the ground. The circulation of hydraulic fluid through the motor provides sufficient resistance to keep the reel from overspinning. However, such devices are relatively expensive and additional clearance along the fence line is needed to accommodate the vehicle. What is needed is a wire dispenser that can be loaded and operated by one person and is simple, reliable and easy to manufacture. The present invention solves this problem.

BRIEF SUMMARY OF THE INVENTION

A spool or roll of wire is held on a horizontal shaft or spindle mounted on a handcart. The shaft or spindle is offset from the wheel axle such that tipping the cart forward raises the spool off the ground and permits the wire to payout from the roll.

In one preferred embodiment, a portion of the frame of the handcart supporting the spindle is hinged to move between an open position and a closed position. In the open position, the frame can slide onto a roll of wire resting on the ground or other such surface. Once in position over the roll of wire, the frame may be closed thereby securing the roll of wire to the cart.

In an alternative embodiment, the horizontal shaft or spindle is removable. With the shaft removed, the cart may be positioned over a roll of wire resting on the ground. The shaft may then be inserted through the roll of wire and secured to the frame of the handcart.

BRIEF DESCRIPTION OF THE SEVERAL VIEWS OF THE DRAWING(S)

FIG. 1 is a perspective view of one embodiment of the invention.

FIG. 2 is an enlargement of latching mechanism employed in the embodiment of FIG. 1.

FIG. 3 is an enlargement of the hinge mechanism employed in the embodiment of FIG. 1.

DETAILED DESCRIPTION OF THE INVENTION

Figure 4:
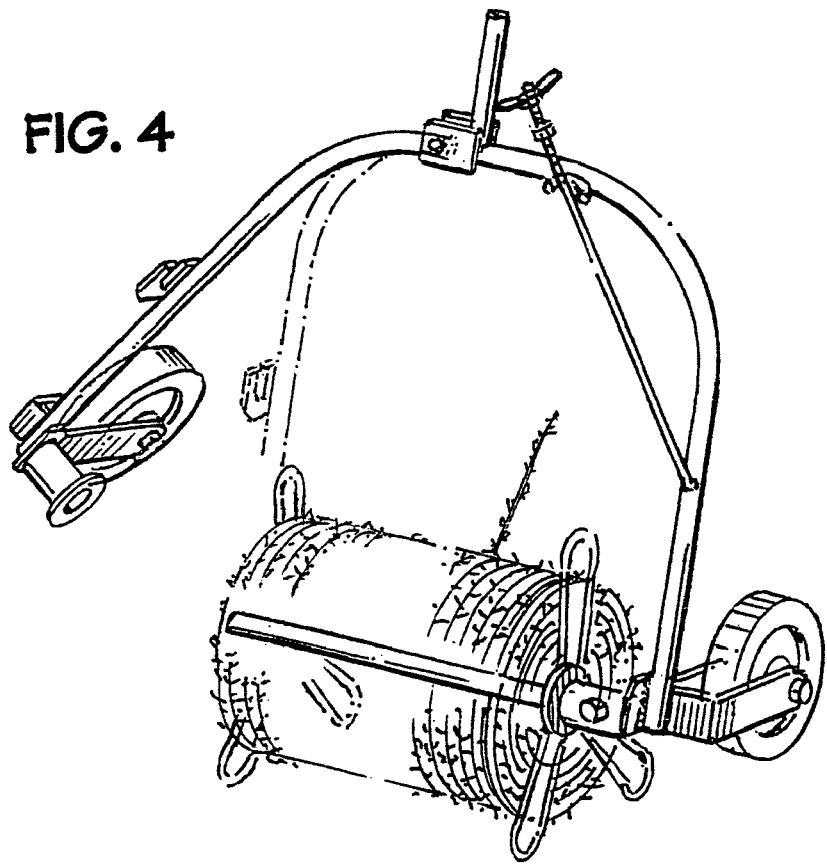
FIG. 4 is a perspective view of the device illustrated in FIG. 1 in the open or loading position.

The invention may be best understood by reference to the drawing figures wherein two preferred embodiments are illustrated.

The first preferred embodiment is shown in perspective in FIG. 1. Carrier 10 may comprise a welded steel tubular frame to which handle 12 is attached. The frame may include a fixed portion 14 and a moveable or hinged portion 16.

Carrier 10 has a transverse shaft or spindle 30 for holding a roll of wire 34 which may be barbed wire 32 for fencing. The wire is supplied on wire reel 36 which has a central, transverse opening through which shaft 30 may be passed. Other wire may be supplied on drums or spools which may also be used with the present invention.

Carrier 10 is also equipped with wheels 38 on axles 40 supported in axle brackets 42. The wheels 38 are preferably aligned, one with the other, in a coaxial arrangement. The axis of aligned wheel axes 40 is offset from the axis of spindle 30 such that tipping carrier 10 forward on wheels 38 lifts spindle 30, raising roll 34 and allowing wire 32 to payout from roll 34 as carrier 10 is moved across the ground, floor, or other such generally horizontal surface. Carrier 10 may be either pushed or pulled depending on which side of roll 34 it is desired to have wire 32 payout. Most commonly, carrier 10 will be pulled by the user and wire roll 34 will be mounted such that wire 32 pays out from the bottom of roll 34.

Carrier 10 may be equipped with bushings 24,26 each having flange 28 which act to center roll 34 on shaft 30 and prevent roll 34 or reel 36 from contacting frame 14 or axle bracket 42 as it revolves on spindle 30.

When the user desires to stop, he or she may move handle 12 to an approximately vertical position such that the bottom of roll 34 or reel 36 contacts the ground or floor. Carrier 10 is then in a stable position, resting on wheels 38 and wire roll 34 or reel 36, as the case may be. Conversely, if it is desired to pull wire from roll 34 with cart 10 stationary, handle 12 may be lowered to the ground or floor, thereby raising spindle 30 and roll 34 such that the roll 34 may rotate freely on shaft 30. In this configuration cart 10 is resting on wheels 38 and handle 12.

The embodiment illustrated in FIG. 1 includes a hinged or moveable frame section 16 which facilitates loading and unloading wire roll 34. Frame hinge 18 is shown in detail in FIG. 3. Fixed frame section 14 and moveable frame section 16 are joined by frame hinge 18 which may comprise two opposing, spaced-apart plates. Bolt 50 having unthreaded portion 51 may be passed through aligned holes in the opposing plates and a hole proximate the end of moveable frame section 16. Bolt 50 may be secured with nut 52 which may be a lock nut. Unthreaded portion 51 acts as a bearing surface for frame section 16. Bolt 50 may be tightened to provide the desired amount of friction between frame member 16 and hinge 18. It may be desired to have sufficient friction to hold frame member 16 in the open position when under the influence of its own weight.

Figure 5:
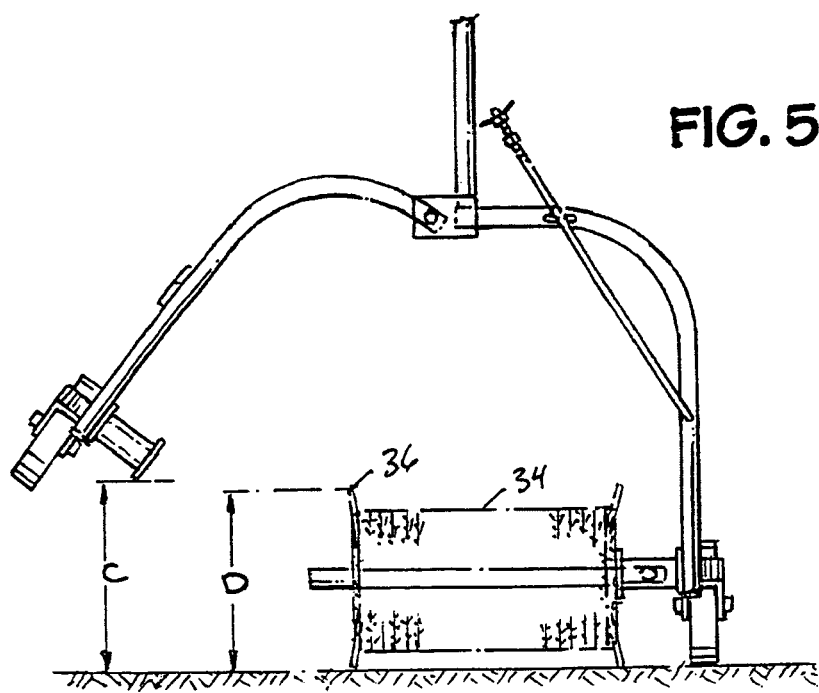
FIG. 5 is a rear view of the device shown in FIG. 1 in the open or loading position.

FIGS. 4 and 5 show carrier 10 in the open or loading position (with the closed position shown in phantom in FIG. 4). Frame locking rod 22 is held out of the way by rod retainer 54 which, in the illustrated embodiment, comprises a U-shaped section welded to fixed frame section 14. As shown in FIG. 5, wire roll 34 is held on reel 36 having diameter D. Hinged frame member 16 is moved outward sufficiently to provide clearance C between flange 28 and the ground or floor on which reel 36 rests such that distance C is greater than diameter D. In this condition, cart 10 may be slid sideways such that spindle 30 is inserted through the center of roll 34 and/or a central aperture in reel 36. Frame member 16 may then be moved to the closed position and locked in place by securing locking rod 22 in lock bracket 44.

Moveable frame member 16 may be held in the closed position by frame locking rod 22 which pivots in hole 23 through fixed frame member 14 on one end and is releaseably secured by frame lock 20 on the opposing end. Frame lock 20 is shown in detail in FIG. 20 and may comprise lock bracket 44 having slot 45 arranged such that when locking rod 22 swings downward it enters slot 45. The end of rod 22 may have a threaded portion to which backing nut 46 and wing nut 48 may be attached. Locking rod 22 may be secured by tightening lock bracket 44 between wing nut 48 and backing nut 46. The alignment of frame member 16 with frame member 14 may be adjusted by moving backing nut 46 along the threaded portion of rod 22.

Figure 6:
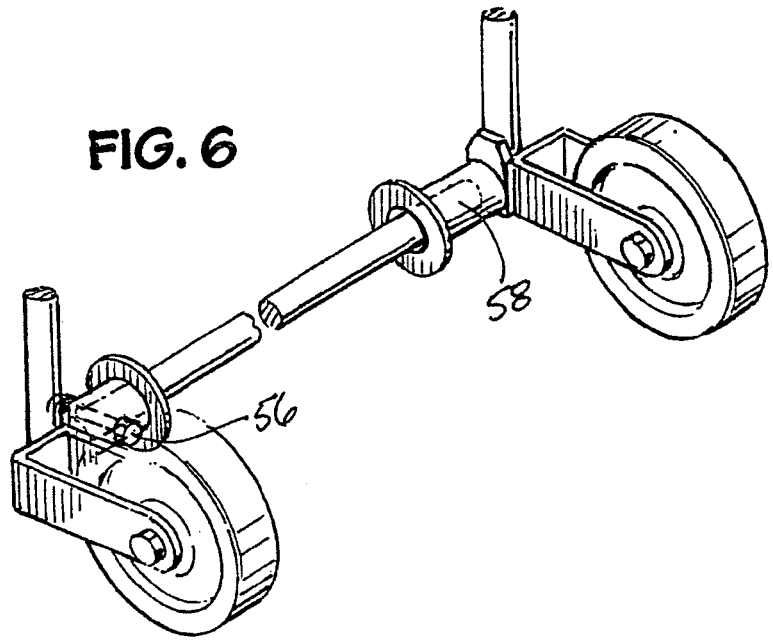
FIG. 6 is a perspective view showing the spindle and wheel assembly of the cart shown in FIG. 1.

As may be best seen in FIG. 6, one end of spindle 30 may be secured in bushing 26 with spindle bolt 56. Bushing 26 and spindle bolt 56 are on fixed frame member 14. The opposing end of spindle 30 is in sliding engagement with bushing 24 on hinged frame member 16. It will be appreciated by those skilled in the art that the central opening in bushing 24 must be large enough to accommodate spindle free end 58 as bushing 24 moves in an arc when frame section 16 pivots on bolt 50 in hinge 18. To further assist in aligning spindle free end 58 with bushing 24 during the closing process, it may be advantageous to allow spindle 30 to pivot on spindle bolt 56 within the confines of bushing 26.

Figure 7:
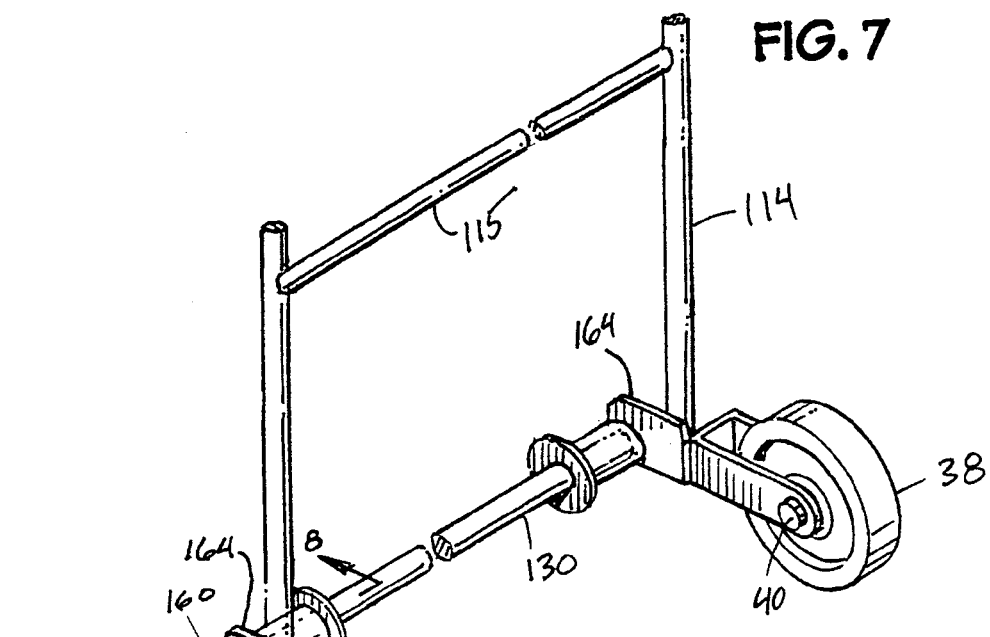
FIG. 7 is a perspective view of the wheel and spindle assembly of an alternative embodiment of the invention.
Figure 8:
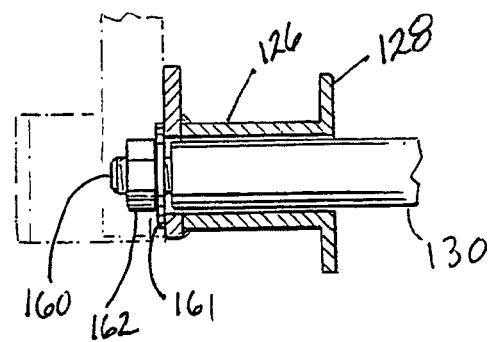
FIG. 8 is a partial cross-sectional view of the spindle-to-frame attachment used in the embodiment of FIG. 7 taken along line 8-8 in FIG. 7.

An alternative embodiment of the invention is shown in FIGS. 7 and 8. In this embodiment, frame 114 is fixed—i.e., unhinged—and may comprise cross member 115 for additional rigidity.

Referring to FIG. 7, it may be seen that spindle shaft 130 is adapted for sliding engagement in spindle support brackets 164 which may comprise bushings 124 and 126 and flanges 128. Each spindle bracket 164 may comprise hole 165 having an internal diameter slightly larger than the diameter of spindle 130 so as to permit spindle 130 to slide through hole 165. Spindle 130 may include threaded stud 160 on each end. Washer 161 has an outside diameter larger than the diameter of hole 165 such that when nut 162 is screwed onto threaded stud 160 over washer 161, spindle 130 is secured in spindle bracket 164 and prevented from sliding in the direction toward the center of the cart. The left side and right side of spindle 130 being similarly secured prevents spindle 130 from sliding in either direction and locks it within frame 114.

The embodiment of FIGS. 7 and 8 may be used by removing one each of nut 162 and washer 161 and then sliding shaft 130 out of the frame. Cart 10 may then be rolled to or lifted over a roll of wire and positioned such that the axis of bushing 124 is in line with the axis of the wire roll. Shaft 130 may then be re-inserted, passing it from the outside of spindle bracket 164 through hole 165 and secured with nut 162 and washer 161.

One disadvantage of the embodiment shown in FIGS. 7 and 8 is that tools may be required to tighten and/or loosen nut 162. In yet other embodiments, nut 162 may be replaced with a knurled knob, wing nut, or similar fastening device that can be operated solely by hand.

In yet other embodiments, handle 12 may be replaced with a hitch to permit cart 10 to be pulled by a vehicle.

Although the invention has been described in detail with reference to certain preferred embodiments, variations and modifications exist within the scope and spirit of the invention as described and defined in the following claims.

What is claimed is:

1. A handcart for unrolling wire comprising:
   a frame comprising a fixed section and a moveable section;
     a hinge connecting the fixed section and the moveable section;
   a spindle for holding a spool of wire supported on a first end by the fixed frame section and supported on a second end by the moveable frame section;
   at least two wheels connected to the frame and having a common axis of rotation the axis of rotation being parallel to and offset from the axis of the spindle such that tipping the cart on the wheels elevates the horizontal spindle; and
   a releasable locking rod attached to the fixed frame member for securing the fixed frame member to the moveable frame member.

2. A handcart as recited in claim 1 further comprising a locking rod retainer on the fixed frame member for holding the locking rod in an unlocked position.

* * * * *